(12) United States Patent
Saavedra

(10) Patent No.: US 8,913,486 B2
(45) Date of Patent: Dec. 16, 2014

(54) SYSTEM, METHOD, COMPUTER PROGRAM FOR MULTIDIRECTIONAL PATHWAY SELECTION

(75) Inventor: Patricio Humberto Saavedra, Toronto (CA)

(73) Assignee: Teloip Inc., Mississauga, Ontario (CA)

( * ) Notice: Subject to any disclaimer, the term of this patent is extended or adjusted under 35 U.S.C. 154(b) by 30 days.

(21) Appl. No.: 13/389,965

(22) PCT Filed: Aug. 12, 2010

(86) PCT No.: PCT/CA2010/001235
§ 371 (c)(1),
(2), (4) Date: Apr. 16, 2012

(87) PCT Pub. No.: WO2011/017804
PCT Pub. Date: Feb. 17, 2011

(65) Prior Publication Data
US 2012/0188868 A1 Jul. 26, 2012

Related U.S. Application Data

(63) Continuation of application No. 12/539,956, filed on Aug. 12, 2009.

(51) Int. Cl.
| | |
|---|---|
| H04L 1/00 | (2006.01) |
| H04L 12/26 | (2006.01) |
| H04L 29/14 | (2006.01) |
| H04L 12/24 | (2006.01) |
| H04L 29/06 | (2006.01) |
| H04L 12/703 | (2013.01) |
| H04L 12/707 | (2013.01) |

(52) U.S. Cl.
CPC ............. H04L 41/5009 (2013.01); H04L 65/80 (2013.01); H04L 43/16 (2013.01); H04L 69/40 (2013.01); H04L 45/28 (2013.01); H04L 45/22 (2013.01); H04L 41/5077 (2013.01); H04L 41/5025 (2013.01)
USPC ........... 370/221; 370/216; 370/225; 370/250; 370/392

(58) Field of Classification Search
USPC ......................... 370/216, 221, 225, 250, 392
See application file for complete search history.

(56) References Cited

U.S. PATENT DOCUMENTS 5,233,604 A * 8/1993 Ahmadi et al. ............... 370/238
6,078,957 A 6/2000 Adelmann et al.
(Continued)

FOREIGN PATENT DOCUMENTS

CN 101056283 B 8/2011
WO WO2007113645 A2 10/2007

OTHER PUBLICATIONS

World Intellectual Property Office, International Search Report dated Dec. 7, 2010, issued in corresponding PCT Application No. PCT/CA2010/001235.

(Continued)

Primary Examiner — Andrew Lai
Assistant Examiner — Andrew C Lee
(74) Attorney, Agent, or Firm — Norton Rose Fulbright Canada LLP

(57) ABSTRACT

The present invention is a system, method and computer program product operable to select a pathway for a communication signal within a network between two end points. The pathway may be selected based on one or more parameters that may be monitored or measured at either, or both, of the two end points. Should one or more of the parameters indicate an imminent network connection failure, the communication signal may be transferred from a primary communication connection to a second communication connection. The present invention may distinguish false from true positive detections and may undertake a transfer of a communication signal within a short response time, so as to support real-time applications. The present invention may manage the pathway to support communication between the two end points at any given time. Such communications may occur in two directions, therefore the management of the pathway can happen in two directions.

23 Claims, 2 Drawing Sheets

(56) References Cited

U.S. PATENT DOCUMENTS

| | | | |
|---|---|---|---|
| 6,108,300 A | 8/2000 | Colie et al. | |
| 6,215,763 B1* | 4/2001 | Doshi et al. | 370/216 |
| 6,370,119 B1* | 4/2002 | Basso et al. | 370/252 |
| 6,400,681 B1* | 6/2002 | Bertin et al. | 370/218 |
| 6,581,166 B1 | 6/2003 | Hirst et al. | |
| 6,628,649 B1* | 9/2003 | Raj et al. | 370/360 |
| 6,732,186 B1 | 5/2004 | Herbert et al. | |
| 6,813,241 B1 | 11/2004 | Wang et al. | |
| 6,895,441 B1* | 5/2005 | Shabtay et al. | 709/238 |
| 6,914,912 B1* | 7/2005 | Skalecki et al. | 370/468 |
| 6,934,249 B1* | 8/2005 | Bertin et al. | 370/218 |
| 6,934,258 B1 | 8/2005 | Smith et al. | |
| 6,944,785 B2 | 9/2005 | Gadir et al. | |
| 7,068,624 B1* | 6/2006 | Dantu et al. | 370/331 |
| 7,080,378 B1 | 7/2006 | Noland et al. | |
| 7,184,402 B1* | 2/2007 | Sharma et al. | 370/232 |
| 7,242,664 B2 | 7/2007 | Einstein et al. | |
| 7,269,157 B2 | 9/2007 | Klinker et al. | |
| 7,333,438 B1* | 2/2008 | Rabie et al. | 370/242 |
| 7,443,857 B1* | 10/2008 | Hsu et al. | 370/395.1 |
| 7,444,538 B2 | 10/2008 | Sciacca et al. | |
| 8,060,875 B1* | 11/2011 | Lambeth | 718/1 |
| 2002/0191573 A1* | 12/2002 | Whitehill et al. | 370/338 |
| 2003/0058798 A1* | 3/2003 | Fleischer et al. | 370/238 |
| 2003/0112749 A1* | 6/2003 | Hassink et al. | 370/225 |
| 2003/0118013 A1* | 6/2003 | Steele et al. | 370/388 |
| 2003/0223359 A1* | 12/2003 | Einstein et al. | 370/228 |
| 2004/0042396 A1* | 3/2004 | Brown et al. | 370/227 |
| 2004/0246973 A1* | 12/2004 | Hoang et al. | 370/395.21 |
| 2005/0169179 A1* | 8/2005 | Antal et al. | 370/231 |
| 2005/0259593 A1 | 11/2005 | Wu et al. | |
| 2007/0280102 A1* | 12/2007 | Vasseur et al. | 370/225 |
| 2008/0002669 A1 | 1/2008 | O'Brien et al. | |
| 2008/0049622 A1* | 2/2008 | Previdi et al. | 370/237 |
| 2008/0069104 A1* | 3/2008 | von Eicken et al. | 370/392 |
| 2008/0219268 A1 | 9/2008 | Dennison | |
| 2009/0003200 A1* | 1/2009 | So | 370/229 |
| 2009/0185484 A1* | 7/2009 | Bless et al. | 370/225 |
| 2009/0304380 A1* | 12/2009 | Sadananda et al. | 398/26 |
| 2010/0265832 A1* | 10/2010 | Bajpay et al. | 370/250 |

OTHER PUBLICATIONS

World Intellectual Property Office, International Preliminary Report on Patentability dated Feb. 14, 2012, issued in corresponding PCT Application No. PCT/CA2010/001235.

Canadian Intellectual Property Office, Examiner's Requisition dated Mar. 26, 2013, issued in corresponding Canadian Patent Application No. 2,770,791.

Canadian Intellectual Property Office, Examiner's Requisition dated Nov. 6, 2013, issued in corresponding Canadian Patent Application No. 2,770,791.

Canadian Intellectual Property Office, Examiner's Requisition dated Feb. 18, 2014, issued in corresponding Canadian Patent Application No. 2,770,791.

State Intellectual Property Office, Office Action dated Mar. 21, 2014, issued on Chinese Patent Application No. 2010800427561 (english translation provided).

Canadian Intellectual Property Office, Examiners Requisition dated Jul. 14, 2014, issued in corresponding Canadian Patent Application No. 2,770,791.

* cited by examiner

SYSTEM, METHOD, COMPUTER PROGRAM FOR MULTIDIRECTIONAL PATHWAY SELECTION

CROSS-REFERENCE TO RELATED APPLICATIONS

This application (U.S. patent application Ser. No. 13/389,965) filed on Apr. 16, 2012, is a nation stage entry application of PCT/CA2010/001235, with international filing date of Aug. 12, 2010, which is a continuation application of U.S. patent application Ser. No. 12/539,956, filed on Aug. 12, 2009, all of which are hereby incorporated by reference.

FIELD OF THE INVENTION

The present invention relates generally to determining a network pathway based on parameters of the pathway measured in more than one direction.

BACKGROUND OF THE INVENTION

Failover is the capability to switch over automatically to a redundant or standby network upon the failure or abnormal termination of a previously active network. There is a general uncertainty surrounding failover in a converged environment, where convergence refers to the combining of real-time applications such as voice and video with data applications over a unified connection, or access method. The uncertainty is the survivability of both the real-time and data applications during primary network failure conditions.

As real-time voice, video and data services are converged, businesses require continuity to support their networking needs. For example, networks must failover to backup connections with minimal or no loss data or live voice over internet protocol ("VoIP") calls. However, prior art shows this goal is difficult to achieve, as existing prior art has failed to provide a system within which minimal or no loss occurs.

Some current prior art failover technologies do support the survivability of data applications during network failover provided that the application's timeout value exceeds the failover time. However, these technologies do not support survivability under failover conditions of real-time applications, such as live VoIP calls, due to lengthy timing issues and the nature of VoIP being comprised of UDP/connectionless traffic states. The connectionless nature of the VoIP application does not provide any error checking or retransmission to maintain the application state during the lengthy failover condition. Furthermore, unstable lower link connections may further impede network failover and compound the loss of data under failover conditions experienced by prior art technologies.

Some existing prior art Internet access methods combine the use of multiple access methods to deliver a unified network connection for the transport of VoIP calls, video over IP, and burst type data applications. However, in the event of a lower link network failure, the prior art currently cannot support the survivability of real-time applications such as live VoIP calls during a failover condition.

Mainly existing prior art focuses upon the area of link failover, especially in the TCP/IP area (e.g. Link2Web protocols, etc.). Such prior art does not provide any solution to separating false positive from true positive failure detections. This limits the results that the prior art technologies can achieve.

Existing prior art examples directed to network failover solutions for TCP/IP (as referred to above), are essentially based on timers. For example, timers are typically used to define an interval for one peer signalling to another peer to verify that the communication session between them has not ceased. The signal may be a ping message or other keep alive or heartbeat message. If there is no response from the second peer to the first peer, then the first peer assumes that the communication session has ceased. Upon assuming a communication session has ceased a new pathway is selected (i.e. the communication is sent to another network component). Clearly, this technique requires the primary pathway to have already failed before a switch to a secondary pathway can occur. Due to the restrictions defined by the timers, in certain circumstances the pathway sometimes cannot be changed quickly enough to avoid a connection loss that is noticeable to client devices at the network end points.

Some prior art also attempts to address the bi-directional nature of voice communication. As an example, some prior art synchronizes the timers, and then subsequently synchronizes transfer of the communication to another pathway. However, these techniques also require that the primary pathway fail before the secondary pathway is used.

Generally, the prior art approaches have a number of disadvantages, including most significantly, (1) significant false positives (particularly if there is significant network congestion), and (2) a higher likelihood of dropped calls in the VoIP context because there is no solution for providing adequate control of the remote network component, such that the connection may terminate prior to deactivation of the remote network component.

An example of prior art affected by false positive error detection is disclosed in U.S. Pat. No. 7,269,157 to Klinker ("Klinker"). Klinker is focused on connectivity verification and/or traffic analysis. Klinker observes packet flow based on the type of traffic (i.e. HTTP, voice etc.) between two components in a network. Klinker lacks contemplation of: (1) an overall architecture that enables control of transportation at all peers; and (2) the collection of enough information to support selection of a new path in time to avert a communication failure. The latter point which is essential to failover capable of supporting real-time applications. The Klinker invention in application is therefore limited to analyzing traffic flow.

Klinker is also specific to Border Gateway Protocol ("BGP"), which is a known prior art approach to communication pathways. In many ways Klinker is an enhancement of certain aspects of BGP. If one removes the known BGP elements from Klinker what is left is essentially a device that is operable to check if another end point is alive. This type of invention is essentially taught by U.S. Pat. No. 6,078,957 to Adelmann.

Additionally, prior art, and ICMP prior art in particular, generally uses higher network layer mechanisms. The higher network layer mechanisms are generally more dependent on traffic, and consequently false positives may result in the presence of congestion (i.e. identification of increased traffic as performance degradation). This can result in reliance on erroneous information for failover purposes, which creates an inefficient system.

SUMMARY OF THE INVENTION

In one aspect, the present disclosure relates to a computer-network-implementable method for failover of a failing network connection existing between at least two network points (such as two end points), characterized in that the method comprises the steps of: utilizing a network control means to identify and establish at one or more network points along a primary network connection between the at least two network end points; utilizing a network information means at each of the one or more network points to gather intelligence relating to at least one performance parameter for each of one or more network connections, said one or more network connections including the primary network connection; establishing a threshold condition for the primary network connection; and accessing a decision tree at the one or more network points when the threshold condition is met, said decision tree being operable to determine whether to avoid the primary network connection, and if the decision tree determines to avoid the primary network connection the undertaking the further steps of: pre-emptively avoiding the primary network connection; the network control means creating a secondary network connection between the at least two network end points; and communicating data over the secondary network connection between the at least two network end points.

In another aspect, the present disclosure relates to a system for failover of a failing network connection between at least two network end points, characterized in that the system comprises: a plurality of network control means, each of the plurality of network control means being linked to one of the at least two network end points, and each of the plurality of network control means being operable to identify and establish one or more network connections and at least a primary network connection between the at least two network end points; a plurality of network information means, each of the plurality of network information means being linked to one of the at least two network end points, and each of the plurality of network information means being operable to gather intelligence relating to at least one performance parameter for the primary network connection; and a decision tree accessible at one or more network points positioned along the primary network connection, said decision tree being accessed when a threshold condition for the primary network connection is met, said decision tree being operable to determine whether to avoid the primary network connection, and if the decision tree determines to avoid the primary network connection: the primary network connection is pre-emptively avoided; a secondary network connection is created between the at least two network end points by the network control means; and data generated at one of the at least two network end points is communicated over the secondary network connection between the at least two network end points.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

The invention will be better understood and objects of the invention will become apparent when consideration is given to the following detailed description thereof. Such description makes reference to the annexed drawings wherein.

Figure 1:
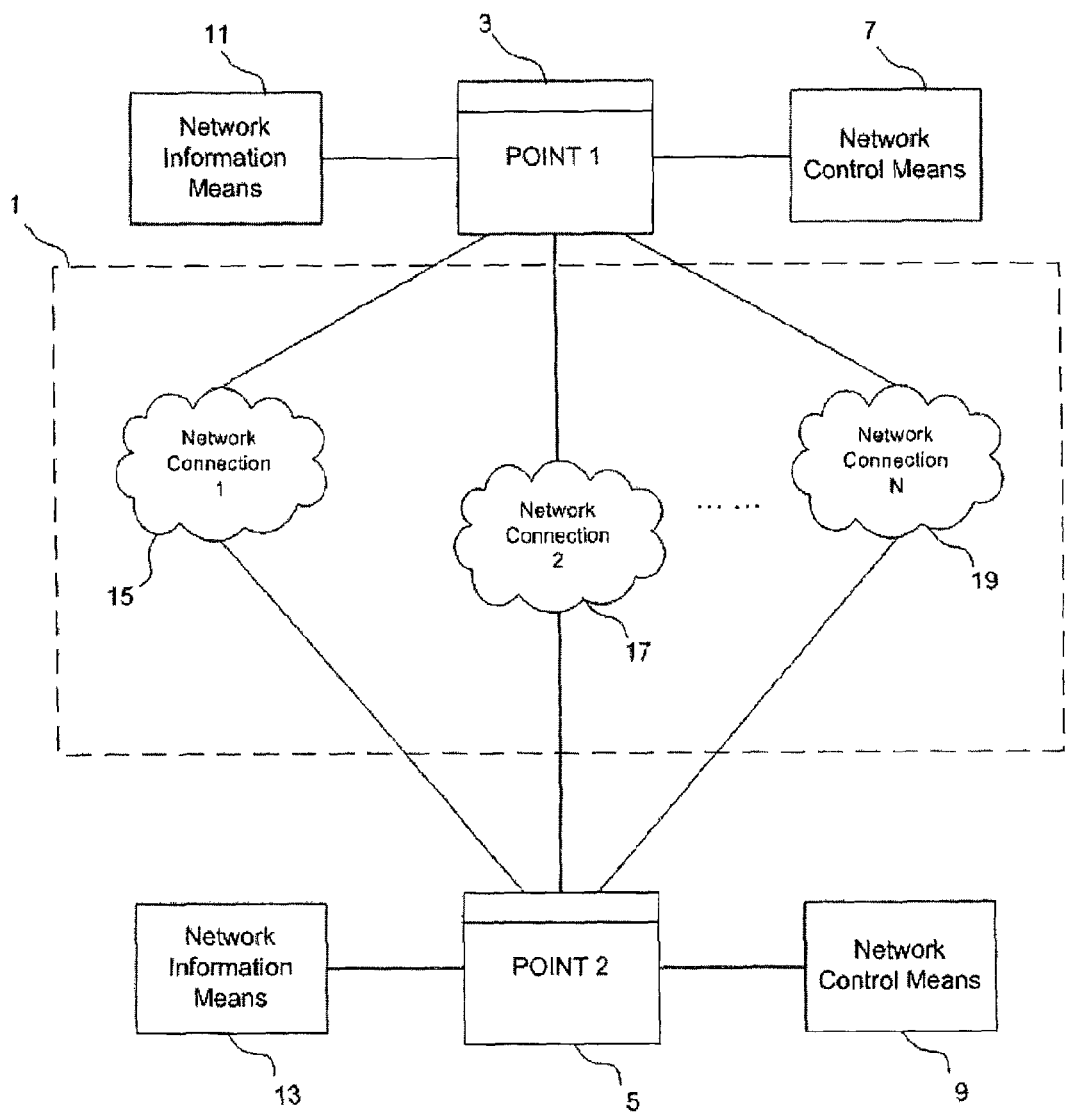
FIG. 1 illustrates a system comprising two points in accordance with the present invention.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION

The present invention provides a system, method and computer program for determining a network pathway based on parameters of the pathway measured in more than one direction. In one embodiment the present invention may be a method for transferring a communication signal between two end points from a first network pathway to a second network pathway when an upcoming or imminent failure is detected by either of the two end points on the first network pathway. The present invention in one aspect is operable to distinguish false from true positive detections. It may further be capable of redirecting or otherwise transferring a communication signal to a secondary pathway or communication connection within a short response time, so as to support real-time applications. Furthermore, the present invention in one aspect is operable to ensure that all peers become aware of any failure in a pathway within such time as to prevent a lost connection, for example, such as a dropped call or dropped words, and other connection issues.

In the discussion in this application a "pathway" may reference a path that a data flow, communication signal, or other flow of information may travel along. Any reference to a "data flow", "communication signal", "communication" or "flow of information" may be read to include any, or all, of these terms and may further be read to include other information transmissions or communications, such as voice transmissions. A skilled reader will recognize the wide variety of information, data and communications that may be transmitted along a pathway and will read these terms into "data flow", "communication signal" or "flow of information" as appropriate for particular embodiments of the present invention.

As described in more detail in this application, and to aid the reader in understanding the terms utilized in the application, a pathway of the present invention may be described as a including a "communication connection", so that a data flow is caused to follow a particular communication connection while travelling a pathway. It may also be possible to transfer, redirect or otherwise move a data flow from one communication connection to another communication connection. The transfer of the data flow to another communication connection may not disrupt the pathway of the data flow, but merely reflect a redirection in the pathway. A pathway may stretch between two "points" so that the data flow travels between the two points, from a first point to a second point. A data flow may also travel from a second point to a first point. Each "point" may be a network node, host, peer or application.

Overview

The present invention provides a multidirectional pathway selection technique that overcomes the limitations of the prior art.

The present invention is directed to managing a network connection pathway for supporting communication between the two or more end points at any given time. These communications may occur in two directions, therefore the connection can be initialized and managed by network devices at either, or both, of the two end points. The present invention in one aspect enables bidirectional connection management. One embodiment of the present invention may be an implementation that is a multipath redundancy protocol. The invention provides a solution for "bi-directional network pathway management".

The present invention is also directed to providing a solution for avoiding point to point, or point to multipoint communication failures. For example, the avoided communication failures may include peer to peer, one to many, or many to one communication failures. One specific embodiment of the present invention is a point to point, or point to multipoint, network communication fast failover utility that enables definition of secondary communication connections before communication failure occurs. The utility may gather intelligence regarding the status of one or more communication connections by monitoring one or more communication parameters relating to each of the communication connections. A secondary connection may be initialized and utilized as a replacement for the primary communication connection when one or more of the communication parameters corresponding to a primary communication connection fall below a predetermined threshold. The present invention may provide for the management of the communication connection on a multidirectional basis. The present invention may achieve fast failover by enabling the selection of a secondary communication connection and the transfer of resources and communication to the secondary communication connection, prior to the primary communication connection fully failing.

The technique of the present invention may provide a solution that is operable where particular client devices at the end points defining the connection are not aware that the primary pathway has failed or been lost. In an implementation of the present invention wherein the client devices are IP telephony devices, this can prevent experiencing what is known as a "dropped call" due to loss of a network connection. A dropped call may occur when a communication connection fails and the pathway (and the data flow travelling on the pathway) is interrupted and/or terminated as a result.

The present invention may be implemented into a network, or network component, of logic that enables identification of a communication connection that is "starting to fail", or is "degrading below a predetermined threshold". When this happens, a change in the communication connection is initiated whereby the failing or degrading communication connection is avoided. In this case, there could be gaps in a data flow and/or communication session, but the data flow and/or communication session (e.g. a call) won't be dropped, and thus loss of data is minimized.

To avert dropped calls and the failure, interruption and/or termination of data flow along a communication pathway between client devices at end points, one embodiment of the present invention may apply a method, system and computer program that enables multi-directional pathway selection that occurs at a rate, for example, such as of 1-3 seconds.

As another example, one embodiment of the present invention may apply a method, system and computer program that enables multi-directional pathway selection to occur at a more rapid rate, for example, such as 10 ms-500 ms, to avert the experience of a loss of data, communication or other information between client devices at end points. A loss of data or information between client devices may be experienced on a voice call as dropped words, as is described in more detail below. A skilled reader will recognize that embodiments of the present invention may be devised to operate to transfer and/or move between communication connections at varying rates and thereby to maintain the pathway flow in a manner applicable to a variety of purposes.

The present invention provides a variety of benefits over known prior art. In particular, prior art fails to offer solutions to specific shortcomings or weaknesses in existing failover technologies. Such shortcomings or weaknesses include the dependability of quality of service and the relation of this to the distance between two peers and/or end points. The result is that end points located at a significant distance from each other can experience a diminished quality of service compared to end points located closer together. The present invention may overcome this disadvantage of the prior art by including adjustments to the intervals and related timer based parameters to achieve an optimal solution that is not variable depending on the distance between end points.

The present invention may also provide a benefit over prior art that requires different components in order to provide bidirectional fast failover. The present invention may be a system that may be implemented at each point to enable the fast failover solution described.

As another example of a benefit of the present invention over the prior art, known prior art may fail to determine the fact that a failure has occurred upon the pathway until a time lapse occurs. Due to the time lapse any movement to a new communication connection may not occur until disruption is experienced in the pathway. Such disruption may be experienced as a dropped call, or dropped words in a call. For example, dropped words may be experienced so that certain words that originate at one end point are not transferred to the other end point. The result is that certain words that are spoken at one end point will not be heard by a listener at another end point. For a pathway does have a voice call travelling along it, the result can be that pieces of a data flow or other communication may be lost during the travelling between two end points. Not all of the data sent from one end point is received at the other end point. This disrupts the flow of conversation and/or data flow, the result can be the loss of vital data, information or other communication.

The present invention may overcome this weakness of the prior art by recognizing the various parameters that indicate that a failure or fault has occurred along the pathway in a particular communication connection quickly. The quick recognition of a pathway failure or fault by the present invention may cause a transfer to a new communication connection to occur quickly. The result may be that, for example in the voice area a call that would otherwise in the realm of known prior art approaches be experienced as a either a "dropped call" or a call with "dropped words" may not result in either of those circumstances. An increase of the frequency of sending a signalling message, as achieved in embodiments of the present invention, may decrease the occurrence of a dropped call or dropped words experience occurring. A skilled reader will recognize the result for a pathway with data that is not a voice call travelling along it will be decrease the occurrence of a lost data flow or lost pieces of a data flow. A skilled reader will further recognize that the frequency increase may in turn increase the resource requirements of the network pathway.

The network layer implementation of the present invention represents another benefit of the present invention over the prior art. Existing prior art generally applies higher network layer mechanisms that are dependent on traffic along a communication connection. The result may be that in the presence of congestion along a communication connection false positives may result. A false positive may occur based on an identification of increased traffic as representing performance degradation. The false positive may have the effect that prior art systems rely upon erroneous information to trigger failover events. This produces an inefficient system. The present invention overcomes this shortcoming of the prior art by utilizing a network layer implementation that provides an advantageous failover capability.

As yet another example of a benefit of the present invention over the prior art, known prior art fails to adequately address load balancing. The prior art may determine pathways based on performance or cost, but these determinations do not avoid dropped calls or dropped words. The means of load balancing applied by the present invention is bi-directional and not merely based on performance or cost. Therefore, the load balancing applied in the present invention is able to overcome problems that the prior art examples are unable to address.

As still another example of a benefit of the present invention over the prior art, known prior art generally does not take bandwidth into consideration. The present invention does consider bandwidth, which achieves an improvement in communication connection use and pathway travels of data flows. The present invention in one aspect thereof will recognize a drop in bandwidth along the primary communication connection, and in particular a drop in bandwidth that is not an absolute failure, and will identify this occurrence as an indication that the pathway should be switched or otherwise transferred to the secondary communication connection. Switching to a secondary communication connection upon a drop in bandwidth may cause the present invention to provide a more consistent connection and pathway travels than is achieved by the prior art. The result is that the present invention may achieve fewer instances of dropped calls, fewer instances of dropped words, as well as fewer instances of other connection issues that interrupt or terminate data flow.

The present invention is based on a point to point, or point to multipoint, architecture. FIG. 1 illustrates a system comprising two points in accordance with the present invention. The system of the present invention may be comprise: (1) a network control means 7, 9 connected to all points 3, 5, such that the system is operable to manage the various points 3, 5 constituting a communication path 1 (e.g., whether through bonding, aggregation or otherwise) in accordance with a fast failover routine (as defined below); and (2) a network information means 11, 13 that is operable to collect or gather status, state, and communication path 1 information from all points 3, 5 so as to identify failure of one more of the points or network components that are part 15, 17, 19 of the communication path 1.

The network information means may use a technique best understood as "communication path propagation". Communication path propagation may be operable to determine network conditions relevant to the communication path. For example, communication path propagation may involve delivering a series of pulses to various points in the communication connection and/or the pathway for the purpose of identifying communication failure in the communication connection. This procedure may identify communication connection failure prior to complete communication failure occurring.

The present invention may be operable to measure a response, or a lack of response, to the pulses and utilize the measurement to identify communication failure of a primary communication connection and/or pathway pre-emptively. In this manner the identification occurs prior to complete communication failure in a communication connection. Upon identifying communication failure in a communication connection pre-emptively the present invention may gather intelligence that enables the system to select a secondary communication connection to which the pathway of data flow or other communication can be redirected. This may cause the system to avert the experience of a communication failure affecting the quality or integrity of the data flow or other communication.

The network conditions measured by operation of this technique as applied by the present invention may relate to a variety of aspects of the communication connection, for example, such as bandwidth, jitter, saturation, loss and/or latency, and other network conditions including network costs. The network information means may operate on a network layer, for example, such as network layer 4 or higher. This network layer may correspond to a layer that is necessary or of import for the transmission of communication that are real-time applications, for example, such as VoIP. A skilled reader will recognize that the present invention could also work at lower layers.

The network information means of the present invention may be implemented to a communication network in a variety of ways. In embodiments of the present invention, the network information means may be implemented: (1) as a client within a network node, for example, such as a router, switch, computer, server, etc.; (2) as a failover system for example, such as a physical and/or logical system, in hardware and/or software; (3) as part of a bonding utility, aggregating utility, or load balancing utility; (4) as part of a phone system, for example, such as PBX, telephone, or IP phone; (5) as functionality implemented as part of a network manager; and/or (6) as part of a communication protocol.

Network Pathway Selection/Determination

In one embodiment of the present invention, initially, a packet distribution technique may be used to establish the primary communication connection and secondary communication connection paths. In another embodiment of the present invention, a subservient (e.g., master-slave) relationship may be established between a primary communication connection and a secondary communication connection.

Communication Path Failure Detection

The present invention may manage a network pathway to support communication between end points at any given time. The network pathway may be either a point to point connection, or a point to multipoint connection. The present invention may also provide a solution whereby point to point, or point to multipoint, network communication failures may be avoided and therefore a data flow along a pathway may not be interrupted or terminated. The present invention may optimally avoids "false positive" failure detections that commonly occur in many existing prior art techniques.

Existing prior art failover techniques are not able to support real-time applications, such as VoIP due in part to timing issues. For example, many prior art techniques are not able to apply timeout values which are required to support real-time application, such as VoIP. In order to support these real-time applications, transfer between communication connections must be performed in near real-time. This necessitates the recognition of any failure of a communication connection, or the signs of an impending failure of a communication connection, as well as a response responding to said failure or signs of failure that is quick.

One way to achieve the required speed may be to query the connection status or state of communication connections at very short intervals. However, an algorithm or other process that undertakes to undertake frequent queries of this type will cause a significant overhead in the system. This type of frequent queries may also cause the communication connection to become unstable. For example, a link quality report ("LQR") packet using the link control protocol ("LCP") may be used to poll a point on the opposite side of a connection, but minimization of the LCP response time is likely to cause a communication connection, especially a lower communication connection, to become unstable. Thus LCP cannot be used to determine failure on lower communication connections in a timely fashion to support real-time applications. A similar result is likely to be obtained using compression control protocol (CCP).

This is achieved by implementing an out of band packet relative to all other failover control protocols. The present invention provides a technique to determine lower communication connection failure that supports disparate connection bonding. The technique of the present invention may have lower communication connections that vary in latency and bandwidth. Thus, this technique may function on a communication connection by communication connection basis and may be adjustable.

A network information means may be provided for obtaining and gathering intelligence including, for example, status, state, and connection information. The intelligence gathered may be determined in accordance with the requirements of embodiments of the present invention. For example, the network information means may monitor the frequency of verification messages (as described below) and may be configured to adjust thresholds for receiving these messages based on communication connection characteristics. The network information means may also monitor the number of unanswered verification messages and allow for the configuration of a threshold number of lost packets to trigger a failure mode. Additionally, the network information means may be adjustable to account for jitter over the communication connections. The network information means may also enable the functions described below. A skilled reader will recognize that the network information means may be applied in a variety of configurations in embodiments of the present invention.

Figure 2:
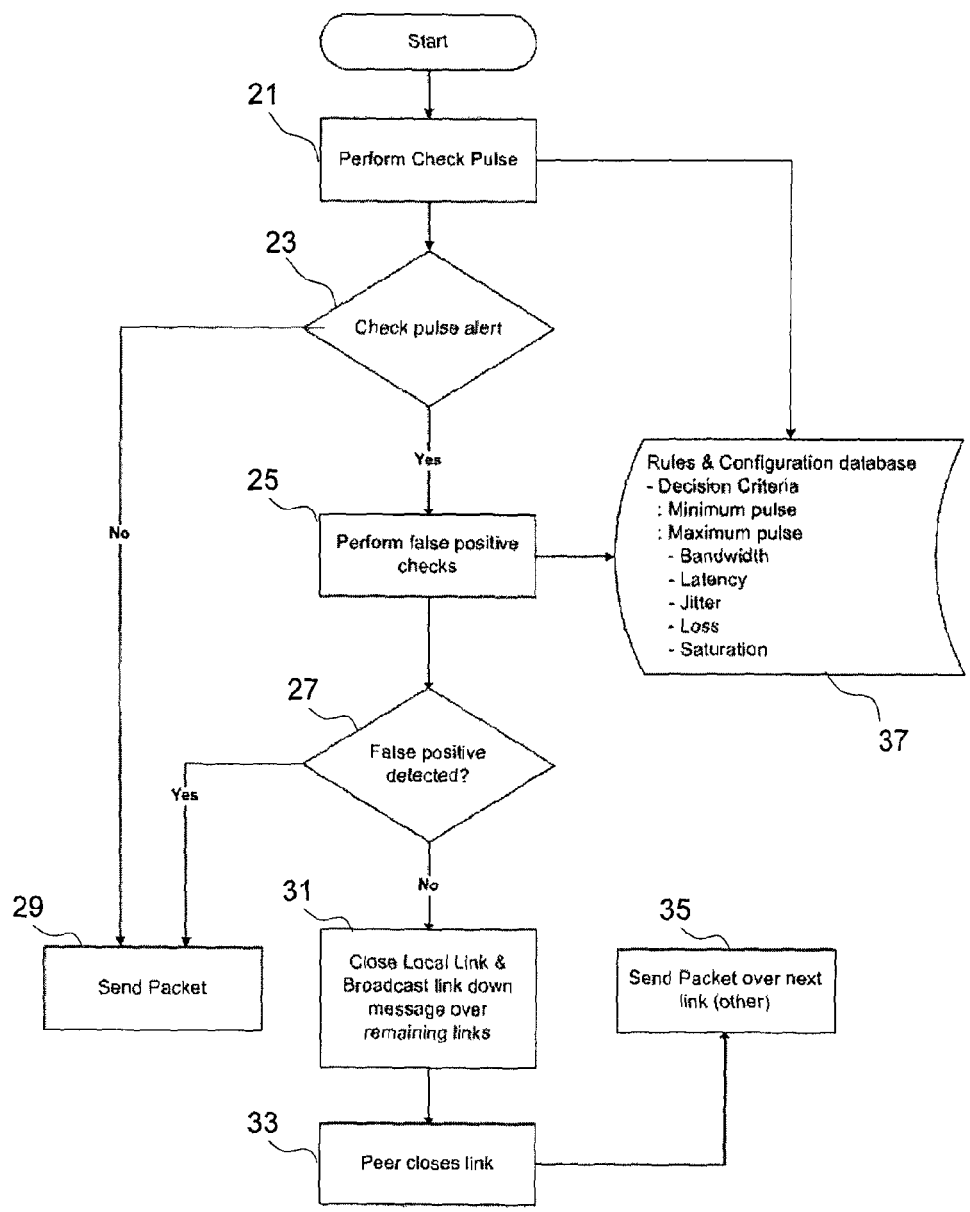
FIG. 2 illustrates a method for multidirectional pathway selection in accordance with the present invention.

In one embodiment of the present invention, a decision tree may be implemented in the layer that manages packet distribution. For example, this layer may be the top layer. FIG. 2 illustrates a technique for rapidly and pre-emptively determining a lower connection failure which is not inhibited by any existing delays or other protocol related timing.

In one embodiment of the present invention, a method and/or system may be implemented as follows: (1) information or intelligence may be gathered, collected or otherwise accessed by a network information means regarding each relevant connection; (2) a structure may be provided for a "connection verification message" corresponding to the pulse referred to above, which each point in the network is operable to send to other points; (3) a configurable threshold may be set for parameters 37 indicating communication connection performance degradation, for example, such as loss, bandwidth, jitter, saturation, latency, or other parameters, and such parameters may be set for each communication connection, based on the transfer 21 of "connection verification messages" by a network control means; (4) once the threshold is met 23, a "decision tree" may be initiated which is operable to analyze the parameters to determine 25 whether to trigger a change 27 in the connection pathway, for example a variety of parameters analyses may be utilized, such as: (a) a further threshold based on parameters of the connection performance parameters given the configuration; (b) interval or timing of the connection verification message; (c) drop in bandwidth, etc.; (d) jitter or latency; (e) costs; (f) application specific parameters; and/or (g) traffic specific parameters, etc.; (5) the results of the decision tree may be applied by the network control means. For example, if the parameters are present that indicate that a secondary communication connection should be created, then a secondary communication connection is created by the network control means. The creation of the secondary communication connection may involve proving the secondary communication connection to the other network points. The creation of the secondary communication connection may also involve closing 31 the primary communication connection and initiating a process for the other point closing 33 the primary communication connection. It should be understood that cost may be taken into consideration in defining the move in the pathway to a secondary communication connection, for example, such as based on time of day. A skilled reader will recognize that other performance parameters may be used, for example, such as including congestion protocols or applications.

If the existing communication connection has not failed, the packet, which may represent a connection verification message, or any other data, information or communication, may be sent 29 over that communication connection. Otherwise, the packet may be sent 35 over the secondary communication connection.

Each point, for example, such as a network component, may include functionality for sending a connection verification message, which may be a packet (as referred to above), to a remote point using the network control means of the present invention. In one embodiment of the present invention, it may be an intermediary that sends and received these messages. For example, a router or relay may relay the messages to other points that are fast failover participants. The connection verification message may provide information to the network information means relating to each point regarding connection performance parameters. The connection performance parameters may those described above.

In one embodiment of the present invention, the system and method may combine two failure detection measures to ensure a maximal true positive detection rate and a minimal false positive detection rate. The determination of whether a connection has failed may be made based upon the status of a lower communication connection. By gathering intelligence regarding the parameters of the communication connection, an imminent failure of the communication connection can be detected within a response time supporting real-time application data. As previously mentioned, these parameters may, for example, include loss, bandwidth, jitter, saturation, latency, other performance based parameters, or any combinations thereof The detected imminent failure may be handled the system transferring a data flow from the communication connection that is indicated to failure imminently, and transferring the data flow to a secondary communication connection. This transfer may cause the data flow to pre-emptively avoid the communication connection that is expected to fail before the failure occurs.

In one embodiment of the present invention, where performance of the communication connection may be monitored by loss, the ability to transmit messages over a communication connection and the current bandwidth being transmitted over the communication connection may be determined by the system.

In another embodiment of the present invention, detection of a true positive may be made using the connection verification message. The connection verification message may be considered to be a pulse, as described above. The message, once received at the destination point, may be operable to require the destination point to send an acknowledgement signal ("ACK") back to the source point. A skilled reader will recognize that the pulse described above, as implemented in IP, provides this acknowledgment as a matter of course. The response time of the ACK signal may be used by the source point to identify a lower communication connection failure within milliseconds of a failed connection condition. Such a time frame typically enables control and manipulation of lower communication connections close enough to real-time so as to support real-time applications. A particular threshold may be set such that by counting un-ACKed messages, a failure mode may be pre-emptively enabled once the threshold is exceeded.

In one embodiment of the present invention, the connection verification messages may be very small packets sent out of band of the actual application data. This may enable the packets to be transmitted in a network layer rather than the data layers, and therefore transmission rates may be likely to be better. Generally this allows the system of the present invention to require less time than is required by prior art technologies, to discover that a problem (e.g. a connection failure) may be about to occur. This embodiment of the present invention may also enable the solution to be OSI layer independent.

At times of heavy traffic, however, the use of the ACK alone may result in false positive readings. These periods of heavy traffic often occur due to burst data traffic and the assymetrical nature of broadband connections. Heavy traffic loads over a primary connection may generate increased latency and in some cases very high latency on lower connections. One result may be that the ACK for the connection verification message may not be received within the threshold time. A trivial solution of desensitizing the detection strength of the present invention may provide a counterproductive result of reducing true positive detections.

An optimal solution that the present invention may apply may be to only utilize the connection verification message at times of relatively normal traffic loads over the primary communication connection. The decision tree may be operable to avoid false positive detection by defining rules including implementation of bandwidth thresholds to confirm whether a positive detection is true or false. The thresholds may correspond to maximum bandwidth in and out on the primary communication connection. Where lower communication connection bandwidth exceeds the maximum bandwidth threshold for the outbound communication connection, the connection verification message results may not be engaged since heavy traffic is known to generate false positives. Instead, when the lower communication connection bandwidth of the outbound communication connection exceeds the maximum bandwidth threshold, then the lower communication connection bandwidth of the inbound communication connection may be analyzed. If the inbound communication connection bandwidth also exceeds the corresponding maximum, then a determination may be made that the connection verification message may not accurately reflect the connection status, and the failure mode enabled by the message may be disabled.

However, if the outbound communication connection bandwidth exceeds the traffic and is actually causing a failure, the inbound bandwidth may show a very low throughput. Therefore, by checking the inbound bandwidth and comparing it to a maximum bandwidth threshold, a failure mode may be engaged and the lower primary communication connection can be avoided in the connection. This method may provide significant improvement towards eliminating false positives. However, it is possible that this measure alone also may result in some false positive detection in a particular scenario wherein heavy traffic is completing a transaction. In this scenario, the outbound communication connection bandwidth may exceed the threshold, resulting in a measurement of the incoming communication connection bandwidth. By this time, the data transaction may be completing, and consequently be causing the bandwidth to gradually (or quickly) lower to less than the maximum incoming communication connection bandwidth value, which may cause a false positive failure mode. A minimum threshold may also be applied to the outbound communication connection.

A failover in accordance with on embodiment of the present invention may be triggered by any of three events: (1) where the number of connection verification messages not acknowledged exceeds a loss threshold and the outbound communication connection bandwidth is between the maximum and minimum thresholds; (2) where too many connection verification messages are not acknowledged, the outbound communication connection bandwidth exceeds the maximum threshold, and the inbound communication connection bandwidth is lower than the minimum threshold; or (3) where too many connection verification messages are not acknowledged and the outbound communication connection bandwidth is less than the minimum threshold. Upon any of these failover modes, the communication connection may be avoided within such a time as to support real-time applications.

The occurrence of any of these three events may be identified by operation of the network information means, and managed by operation of the network control means. The network control means may be best understood as a utility that implements the decision tree, in a pre-emptive and bi-directional manner.

The network control means may be implemented to a communication network in a variety of ways. For example, the network control means may be implemented: (1) as a client within a network node, for example, such as a router, switch, computer, or server, etc.; (2) as a failover system, for example, such as physical and/or logical, in hardware and/or software; (3) as part of a bonding utility, aggregating utility, or load balancing utility; (4) as part of a phone system, for example, such as PBX, telephone, or IP phone; (5) as functionality implemented as part of a network manager; or (6) as part of a communication protocol. The network information means and the network control means therefore may be implemented as complementary processes, features or utilities integrated within the communication network resources (1) to (6) described in the preceding sentence.

A skilled reader will recognize that any other monitored parameter or combination thereof, as identified above may be used in the decision tree, depending on the particular network conditions expected to cause a failure mode.

Once a failure has been detected, the point detecting the failure may notify other points of the primary communication connection outage by sending a message to the points over all the remaining communication connections. This notification may be provided by techniques also used with load balancing, bonding or other network protocols. This notification may further enable the point to avoid the primary communication connection and to override its own pulses for the connection. This avoidance technique may also help speed up the failover process or pathway selection process. A logging utility may also be provided for recording the failure.

The aggregation technique may also identify when primary communication connections come back online. Primary and secondary communication connections that are avoided continue to receive pulses and can be reintegrated to the pathway of the data flow through packet distribution.

It will be appreciated by those skilled in the art that other variations of the embodiments described herein may also be practiced without departing from the scope of the invention. Other modifications are therefore possible.

I claim:

1. A computer-network-implementable method for failover of a failing network connection existing between at least two network end points, comprising:

(a) utilizing a network control means to identify and establish at one or more network points along a primary network connection between the at least two network end points;
(b) utilizing a network information means at each of the one or more network points to gather intelligence relating to at least one performance parameter for each of one or more network connections, said one or more network connections including the primary network connection;
(c) establishing a threshold condition for the primary network connection; and
(d) accessing a decision tree at the one or more network points when the threshold condition is met, said decision tree being operable to determine whether to avoid the primary network connection, and if the decision tree determines to avoid the primary network connection, undertaking the further steps of:
  (i) pre-emptively avoiding transmitting data over the primary network connection prior to the occurrence of a failure of the primary network connection;
  (ii) the network control means creating a secondary network connection between the at least two network end points; and
  (iii) communicating data over the secondary network connection between the at least two network end points.

2. The method of claim 1, comprising the network information means communicating at least one connection verification messages between the one or more network points to gather the intelligence.

3. The method of claim 2, comprising the network information means pulsing the at least one connection verification messages between the network information means of each of the one or more network points.

4. The method of claim 3, comprising the network information means receiving the at least one connection verification messages, and transmitting an acknowledgement message for each received connection verification message to the network information means.

5. The method of claim 4, comprising the decision tree determining to avoid the primary network connection if: one or more acknowledgement messages are received by the network information means and the number of unacknowledged connection verification messages received exceeds a loss threshold; and a bandwidth measurement relating to transmission from at least one of the one or more network points is between a maximum bandwidth threshold and a minimum bandwidth threshold.

6. The method of claim 4, comprising the decision tree determining to avoid the primary network connection if: one or more acknowledgement messages are received by the network information means and the number of unacknowledged connection verification messages received exceeds a loss threshold; a bandwidth transmission measurement for transmission from the network point exceeds a maximum bandwidth threshold; and a bandwidth reception measurement relating to reception to at least one of the one or more network points is lower than a minimum bandwidth threshold.

7. The method of claim 4, comprising the decision tree determining to avoid the primary connection if: one or more acknowledgement messages are received by the network information means and the number of unacknowledged connection verification messages received exceeds a loss threshold; and a bandwidth measurement relating to transmission is less than a minimum bandwidth threshold.

8. The method of claim 1, comprising identifying performance parameters, said performance parameters including one or more of the following: loss, bandwidth, jitter, saturation, latency, or cost.

9. The method of claim 1, comprising the network control means reintegrating the primary network connection when the threshold condition is no longer met.

10. The method of claim 1, comprising connecting one or more client devices to each of the at least two network end points, said client devices being operable to generate at least one of the following for transfer along the one or more network connections: data; information; or a communication signal.

11. A system for failover of a failing network connection between at least two network end points, comprising: (a) a plurality of network control means, each of the plurality of network control means being linked to one of the at least two network end points, and each of the plurality of network control means being operable to identify and establish one or more network connections and at least a primary network connection between the at least two network end points; (b) a plurality of network information means, each of the plurality of network information means being linked to one of the at least two network end points, and each of the plurality of network information means being operable to gather intelligence relating to at least one performance parameter for the primary network connection; and (c) a decision tree accessible at one or more network points positioned along the primary network connection, said decision tree being accessed when a threshold condition for the primary network connection is met, said decision tree being operable to determine whether to avoid the primary network connection, and if the decision tree determines to avoid the primary network connection: transmission of data over the primary network connection is pre-emptively avoided prior to the occurrence of a failure of the primary network connection; a secondary network connection is created between the at least two network end points by the network control means; and data generated at one of the at least two network end points is communicated over the secondary network connection between the at least two network end points.

12. The system of claim 11, wherein the network information means communicates at least one connection verification messages between the at least two network end points to gather the intelligence.

13. The system of claim 12, wherein the at least one connection verification messages are pulsed between the network information means of each of the at least two network end points.

14. The system of claim 13, wherein the network information means receives the at least one connection verification messages and transmits an acknowledgement message to the network information means for each received connection verification message.

15. The system of claim 14, wherein the decision tree determines to avoid the primary network connection if: one or more acknowledgement messages are received by the network information means and the number of received unacknowledged connection verification messages exceeds a loss threshold; and a bandwidth transmission measurement for transmission from one of the one or more of the network points is between a maximum bandwidth threshold and a minimum bandwidth threshold.

16. The system of claim 14, wherein the decision tree determines to avoid the primary network connection if: one or more acknowledgement messages are received by the network information means and the number of received unacknowledged connection verification messages exceeds a loss threshold; a bandwidth transmission measurement from one of the one or more network points exceeds a maximum bandwidth threshold; and a bandwidth reception measurement for reception to the one or more network points is lower than a minimum bandwidth threshold.

17. The system of claim 14, wherein the decision tree determines to avoid the primary network connection if: one or more acknowledgement messages are received by the network information means and the number of received unacknowledged connection verification messages exceeds a loss threshold; and a bandwidth measurement for transmission is less than a minimum bandwidth threshold.

18. The system of claim 11, wherein the at least one performance parameter may include one or more of the following: loss, bandwidth, jitter, saturation, latency, or cost.

19. The system of claim 11, wherein the network control means reintegrates the primary network connection when the threshold condition is no longer exceeded.

20. The system of claim 11, wherein one or more client devices are connected to each of the at least two network end points, said client devices being operable to generate one or more of the following for transfer along the one or more network connections: data, information or a communication signal.

21. The system of claim 11, wherein the plurality of network information means are operable to utilize the at least one performance parameter to detect a maximum of true positives that accurately indicate the failing network connection and a minimum of false positives that wrongfully indicate that the one or more network connections are failing.

22. The system of claim 11, wherein the decision tree is operable to function at a fast speed to determine to pre-emptively avoid the primary network connection and to create the secondary network connection, said fast speed of the decision tree functioning to support one or more real-time applications.

23. The system of claim 22, wherein the one or more real-time applications include at least one of the following: a VoIP application, video over IP application, or a burst type data application.

* * * * *